(12) United States Patent
Scherer et al.

(10) Patent No.: US 6,233,962 B1
(45) Date of Patent: *May 22, 2001

(54) CHANNELED FREEZE PROCESSING OF NON-SOLID MATERIALS

(75) Inventors: John Stirling Scherer, Santa Monica; Frank Scherer, Riverside, both of CA (US)

(73) Assignee: SIR Worldwide, LLC, Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/431,656

(22) Filed: Nov. 1, 1999

Related U.S. Application Data

(63) Continuation-in-part of application No. 08/854,581, filed on May 12, 1997, now Pat. No. 5,974,821.

(51) Int. Cl.[7] .................................................. F25C 5/10
(52) U.S. Cl. .............................................. 62/303; 62/356
(58) Field of Search ........................... 62/303, 347, 352, 62/356

(56) References Cited

U.S. PATENT DOCUMENTS

| 990,590 | * | 4/1911 | Ray | 62/356 |
|---|---|---|---|---|
| 1,925,616 | * | 9/1933 | Velut | 62/356 |
| 4,044,568 | * | 8/1977 | Hagen | 62/352 |
| 4,318,278 | * | 3/1982 | Olson et al. | 62/347 |
| 5,029,453 | * | 7/1991 | Scherer | 62/320 |
| 5,524,451 | * | 6/1996 | Tippmann | 62/356 |
| 5,974,821 | * | 11/1999 | Scherer et al. | 62/303 |

* cited by examiner

Primary Examiner—William E. Tapolcai
(74) Attorney, Agent, or Firm—Oppenheimer, Wolff & Donnelly LLP

(57) ABSTRACT

A system for the freeze processing of materials includes two spaced units, each including a plurality of channels. A refrigeration system intercouples the two units so that heat extracted from material as it is being frozen in one unit is employed to thaw frozen material in the other unit. Separately movable harvest assemblies including squeegee-like members are provided to advance treated material out of the channels. The harvest assemblies may include spray nozzles for cleaning the channels.

21 Claims, 14 Drawing Sheets

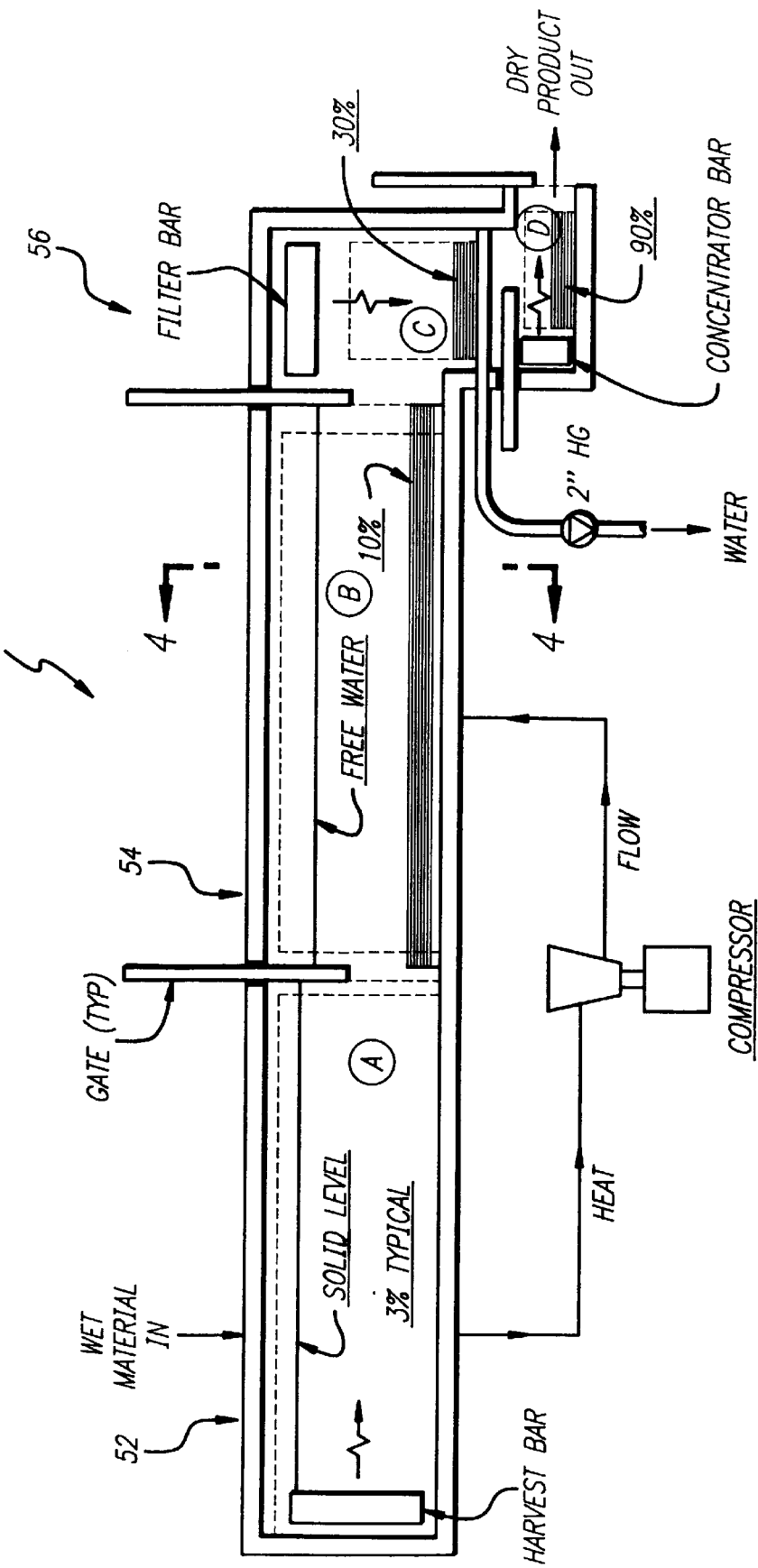

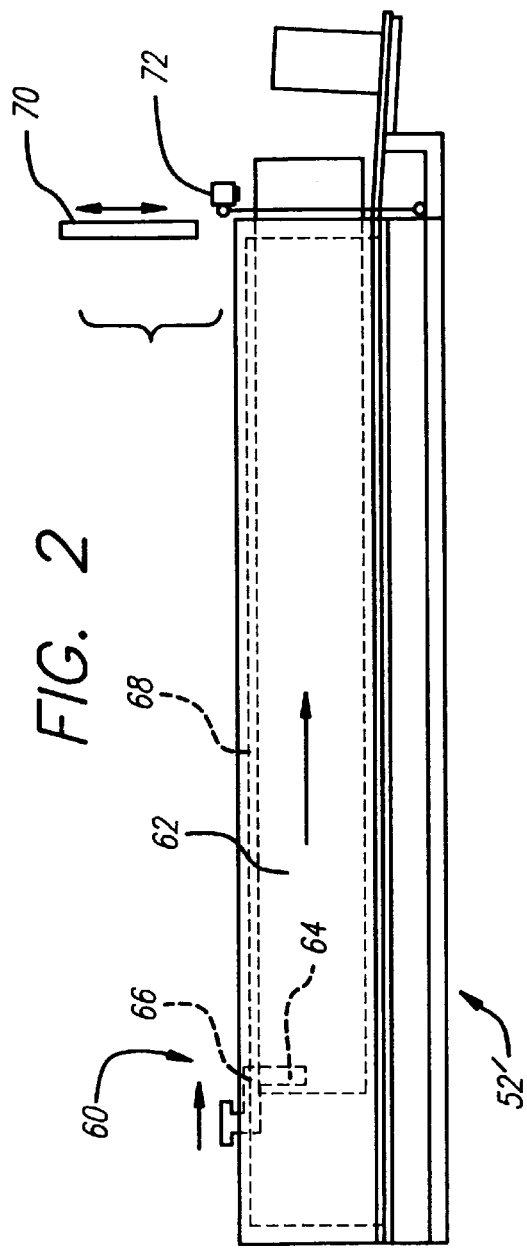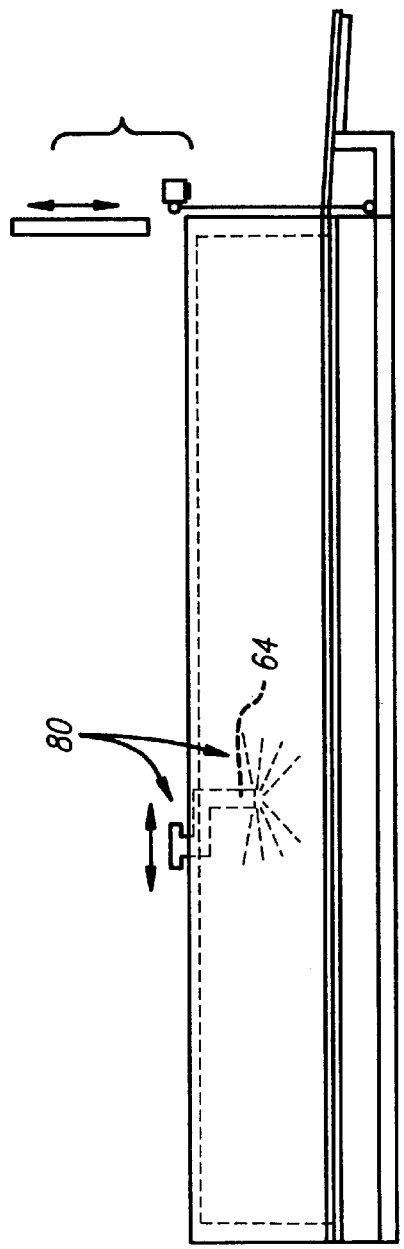

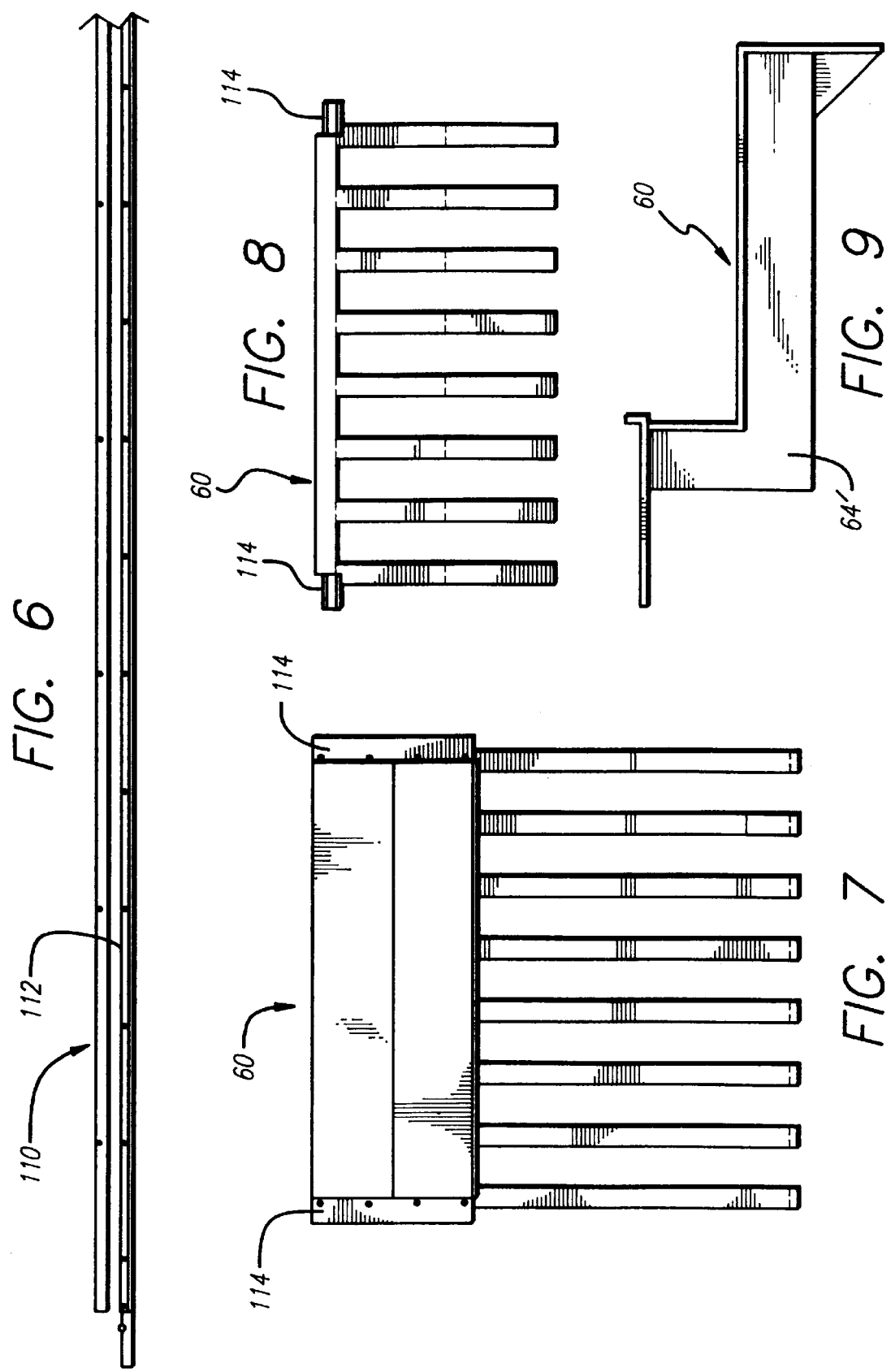

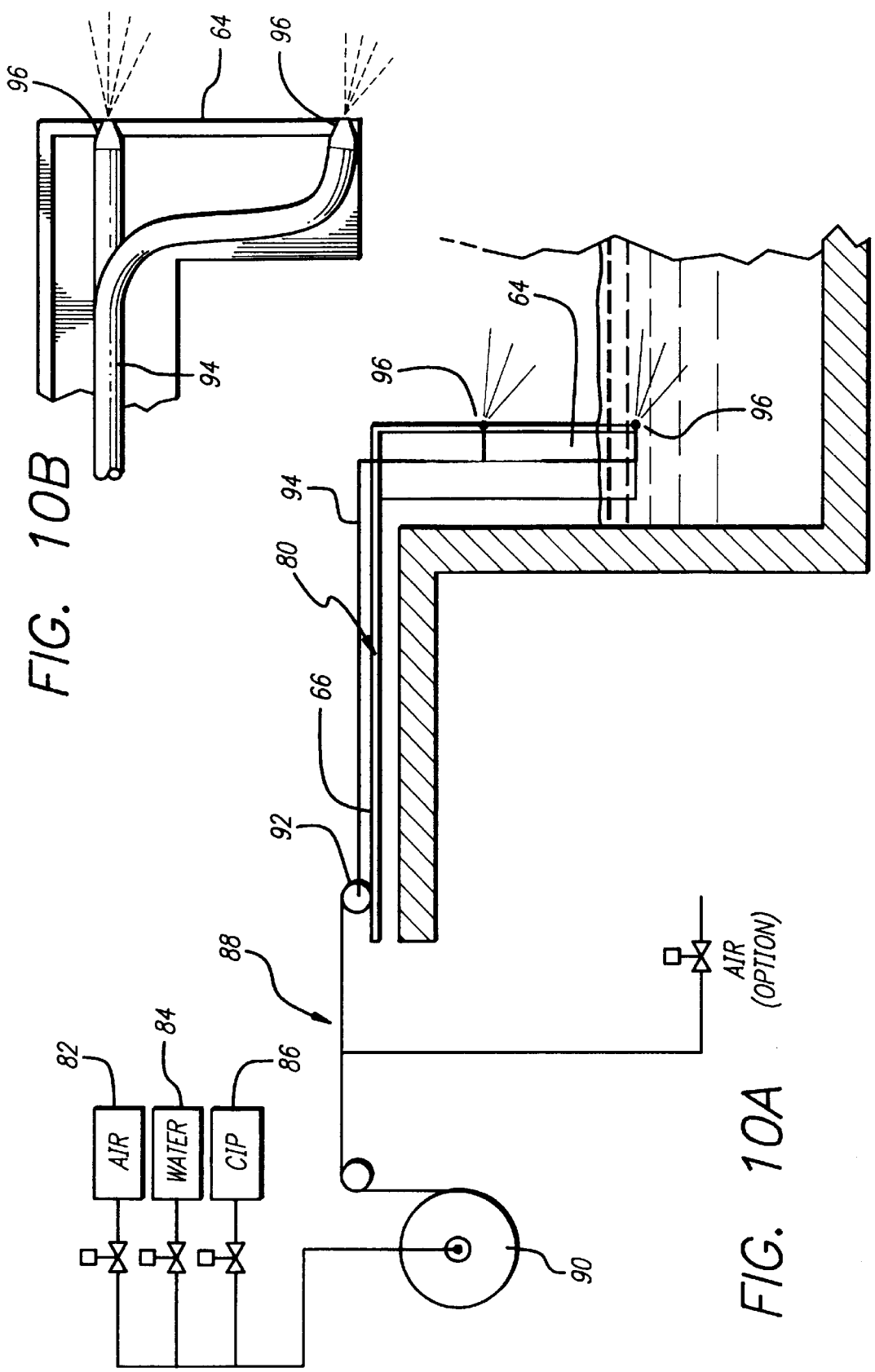

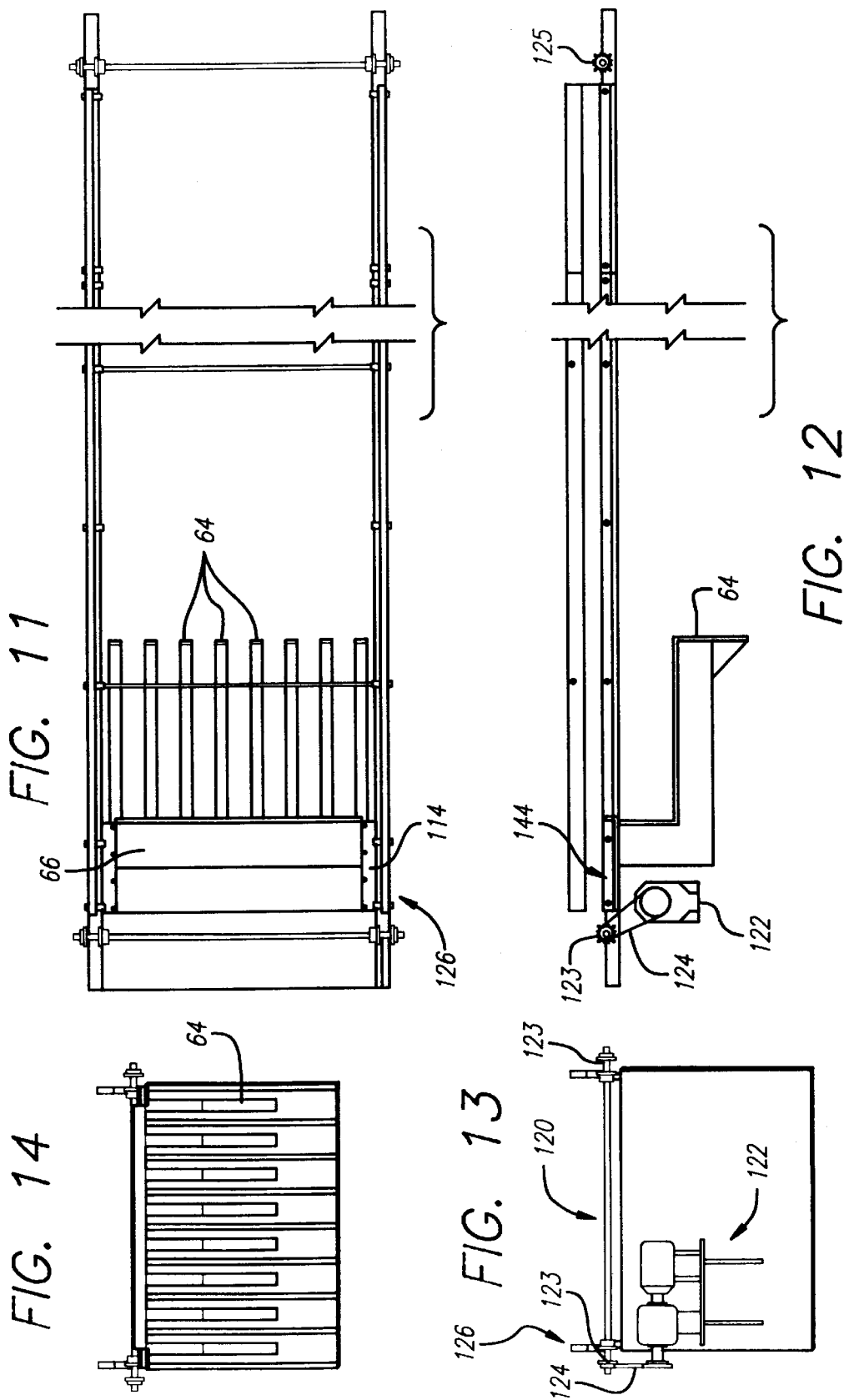

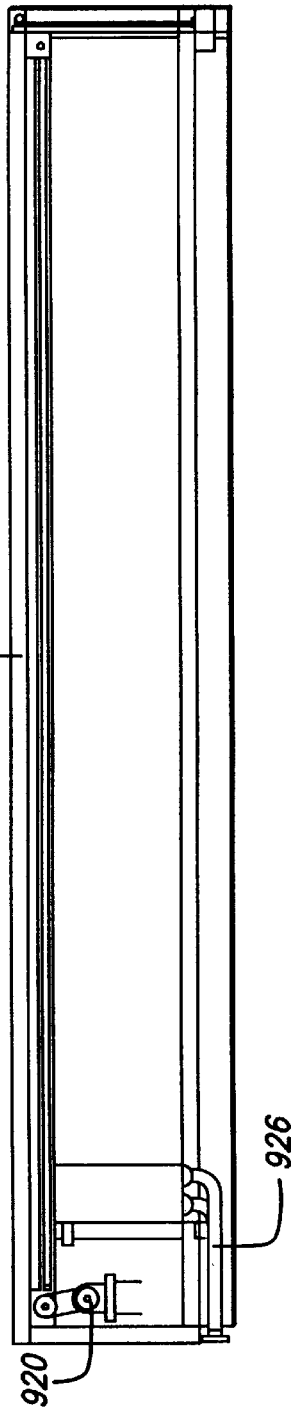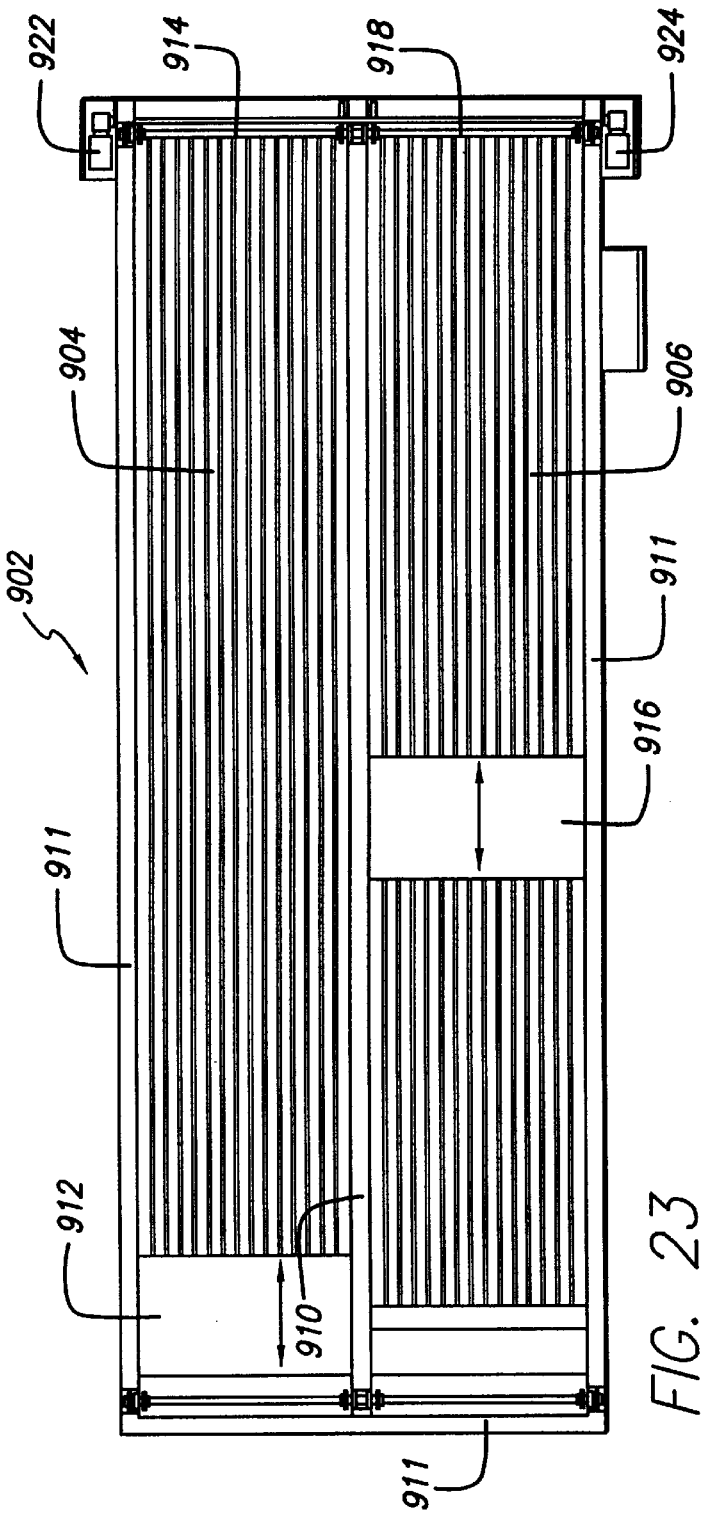

CHANNELED FREEZE PROCESSING OF NON-SOLID MATERIALS

RELATED PATENT APPLICATIONS

This patent application is a continuation-in-part of U.S. patent application Ser. No. 08/854,581, filed May 12, 1997, and entitled "System and Method for Channeled Processing of Non-Solid Materials" now U.S. Pat. No. 5,974,821.

BACKGROUND OF THE INVENTION

1. Field of the Invention

The present invention relates to a system and method for processing materials and products and, more particularly, is embodied in a closed-cycle, channeled system for processing non-solid products and materials that can be brought to a frozen or solid state by lowering the temperature of the products.

2. Description of the Related Art

Biosolids, or biosludge, is the byproduct of a biological wastewater treatment process and comprises, for example, a mixture of biomass, residual salts and metals, and water.

Costs for landfilling in the United States range from $16 per ton of solids at a waste treatment plant in Oakland to $150 per ton at a landfill in a site in New Jersey. In Europe, disposal costs are more than $500 per ton of residual. Canada and the United States have passed legislation requiring moisture content to be substantially reduced prior to shipping it to regular disposal sites. Several North American landfills require more than 25% solids in waste materials received. Typically, the dewatering, treatment and disposal of biosludges accounts for 30% of capital and 50% of operating costs for utilities. Furthermore, optimized biological treatment systems increased efficiency produce more biosolids that are known to be more difficult to dewater.

Thus, an ever growing concern to governments, industry and environmentalists alike is how biosolids, or biosludge, can be disposed of in a cost effective manner which is not harmful to the environment and which consumes a minimum amount of land fill space. Other biosolids which often need to be dewatered include the byproducts of refineries and oil fields, breweries, industrial waste water treatment plants, ceramics, clay and coal facilities, pulp and paper mills and drinking water filtering plants.

A significant problem of existing dewatering systems is that they are not "closed cycle" systems. In other words, existing sludge dewatering equipment (e.g., belt filter press, filter press, centrifuge, screw press) rely upon various potentially harmful chemical additives. These chemical additives are costly, potentially harmful to the environment and, in some cases, necessitate the collection and treatment potentially harmful, dangerous and/or explosive gases and vapors.

Unlike existing sludge dewatering processes that rely upon polymers to separate water from sludge particles, several embodiments of the present invention advantageously utilize a natural phenomenon called "freeze-thaw" to facilitate a non-chemical liquid/solid separation. Generally, conditioning by freeze-thaw increases the effectiveness of the dewatering process. More specifically, freeze-thaw processes rupture microbial cells and allow entrapped water to escape.

There are different types of water in biosolids produced by an activated sludge system. The four types of water existing within biological system solids are: (1) free (or bulk) water—water not associated with suspended solid particles; (2) interstitial water—water trapped in the crevices and interstitial spaces of the flocs and organisms; (3) viccinal water—multiple layers of water molecules held tightly to the particle surface by hydrogen bonding; and (4) water of hydration—the water chemically bound to the particles. It has been observed that freeze-thaw conditioning is particularly effective at reducing interstitial and viccinal moisture.

The rates at which various product processing steps occur have a direct bearing on the efficiency of the overall process. A significant aspect of the present invention is that certain embodiments include channeled sub-units which effect a more efficient rate of freezing, thawing, etc. In one embodiment of the present invention, the sub-units of the system include a freeze unit, a thaw unit and a low temperature condenser unit which operate together as an integrated system, yet which are also modular and individually useful for processing certain products. For example, the freeze unit, as a stand-alone unit, can be suitably employed as an automated, high-volume block production system for processing juices, fruits and food products including, but not limited to, chicken parts, broth and gravies, meat products, seafood and eggs.

For completeness, reference is made to U.S. Pat. No. 5,029,453, granted Jul. 9, 1991, inventor J. Stirling Scherer, which discloses a channel block system for freezing material.

One object of the present invention is to provide a system and method for closed-cycle processing of non-solid products that can be brought to a solid state by lowering the temperature of the products.

Another object is to provide a closed-cycle system for efficiently dewatering biosolids or other non-food and/or food products without employing potentially harmful chemicals.

Another object is to provide a product processing system with a plurality of interconnected, channeled, modular sub-units which operate together as an integrated system or individually to process certain products.

Another object is to provide a stand-alone freeze unit including a plurality of channels for efficiently and automatically freezing juices, fruits and other non-solid food products into blocks.

Another object is to provide such a freeze unit which additionally includes a mechanism adapted to automatically advance frozen products from the channels and to clean the inside of the channels after the frozen products are removed.

Another object is to provide a product processing system wherein a plurality of plates define product processing channels as well as provide structural support to the system.

SUMMARY OF THE INVENTION

In accordance with one illustrative specific embodiment of the invention, a system for the freeze processing of materials includes a freeze section including a first elongated channel, a thaw section including a second elongated channel aligned with said first elongated channel, a movable barrier for selectively blocking the flow of material between the two sections, a refrigeration system for freezing material to be processed into one or more elongated frozen blocks, a movable member for advancing the frozen blocks of material from the freeze section into the thaw section; said refrigeration system being coupled to exchange heat obtained from said freeze section in the course of freezing said material with said thaw section to thaw frozen blocks of material which have been transferred from the freeze section to the thaw section.

The foregoing system may be provided with (1) a drain in the thaw section to drain off excess fluid such as water, leaving a residue such as sludge in the thaw section, (2) a movable barrier at the outlet end of the thaw section which may be opened to receive the sludge or residue from the thaw section when a new frozen block is shifted from the freeze section to the thaw section, and (3) a unit for further removing liquid or water from the residue or sludge, coupled to the output of the thaw section.

With regard to the freeze-thaw system, the arrangements for further removing fluid or water from the residue or sludge may include a low temperature condenser unit including a heating condenser and a condenser-evaporator, employing a partial vacuum to lower the boiling point of the liquid or water to facilitate water separation.

It is contemplated that the freeze processing units may be quite large, ranging from one or two feet in height and 10 to 20 feet in length, up to 10 or 12 feet in height and 100 or more feet in length. The units would generally be open or unconfined at the top to permit expansion upon freezing of the products or materials being processed. Preferably, each section of the system would include several parallel channels in which material would be frozen, but a single channel could be used.

Concerning the movement of frozen blocks from the freeze section, this may be accomplished by a harvest assembly which is mechanically activated to traverse the length of the system, with "dogs" or depending members which engage the frozen blocks of material, and which may be frozen into the rear ends of each channel block of frozen material. Preferably, spray nozzles may also be mounted on or are mountable on the harvest bar arm, so that the system may be readily cleaned by traversing the harvest bar while the nozzles are spraying fluid. The spray cycle could include a clear water or stream rinse cycle, a cleaning fluid spray cycle, and a final rinse cycle, with the harvest bar traversing the length of the system three times. The spray nozzles or other cleaning equipment may be formed as part of the harvest dogs, or may be separately mounted on or mountable on the harvest bars. For freezing juices, for example, in the course of shifting over from orange juice to another fruit juice, it might be sufficient to have a single steam rinse cleaning cycle rather than a full three step cleaning cycle.

For the freeze-thaw systems, the harvest assembly would normally only be required to traverse one-half the total length of the system, to move the frozen channel blocks of material from the freeze section to the thaw section; but for cleaning purposes the harvest bar may be arranged to traverse the full length of the system, including both the freeze section and the thaw section.

In accordance with another aspect of the invention, materials may be processed by successive freezing and thawing in first and second chambers, and a refrigeration system is provided which uses the heat produced in freezing material in one of the two chambers to currently thaw previously frozen material in the other chamber.

In the implementation of the system outlined in the previous paragraph, various alternatives may be employed. Thus, for example, the material may be frozen in one chamber, and then advanced into another chamber for thawing while additional material to be processed is frozen in the first chamber. Alternatively, two spaced chambers may be employed with freezing and thawing both taking place in both chambers, but with freezing occurring in one chamber while thawing is taking place in the other, and with the heat generated in the freeze cycle being employed to thaw frozen material in the other chamber. Following this step, the thawed material is transferred out and new material is fed into the empty chamber; and the new material is frozen while the previously frozen material is thawed, with the complete freeze-thaw cycle occurring in both chambers.

In accordance with a further aspect of the invention, when a system using two spaced freeze-thaw units is employed, the harvest assemblies may be provided with depending arms having squeegee-like resilient material or flaps for advancing the treated material out of the units following the freeze-thaw treatment.

In addition, the two freeze-thaw units may be located immediately adjacent one another, preferably with thermally insulating space or material between the two units, and the harvest bars and the outlet barriers may be operated independently, to accommodate the complementary but different freeze-thaw cycles of the two units of the system.

BRIEF DESCRIPTION OF THE DRAWINGS

Other objects, features and advantages of the invention will become readily apparent upon reference to the following detailed description when considered in conjunction with the accompanying drawings, in which like reference numerals designate like parts throughout the figures thereof, and wherein:

FIG. 1 is a simplified, cross-sectional side view of a preferred system for closed-cycle, channeled processing of non-solid materials, illustrating one embodiment of the invention;

FIG. 2 is a simplified, cross-sectional side view of a freeze unit similar to that shown in the system of FIG. 1, the freeze unit including a harvest mechanism partially embedded within a block of frozen product, such as orange juice, with the harvest mechanism pushing the frozen product out of the freeze unit;

FIG. 3 is a simplified, cross-sectional side view of a freeze unit similar to that shown in the system of FIG. 1, the freeze unit including a harvest mechanism with nozzles for cleaning the inside of the freeze unit after the frozen product has been pushed out of the freeze unit;

FIG. 6 is a cross-sectional view of a harvest guide rail for the closed-cycle, channeled processing system of FIG. 1;

FIG. 7 is a top view of a preferred harvest mechanism for the closed-cycle, channeled processing system of FIG. 1;

FIG. 8 is a side view of the preferred harvest mechanism of FIG. 7;

FIG. 9 is a front view of the preferred harvest mechanism of FIG. 7;

FIG. 10 is a cross-sectional front view of an alternative preferred harvest mechanism including nozzles formed within the dog portion which serve as part of a clean-in-place system shown in the figure;

FIG. 11 is a top view of the harvest mechanism and a drive system for moving the harvest mechanism laterally within the freeze unit of FIG. 1;

FIG. 12 is a front view of the harvest mechanism and drive system of FIG. 11;

FIG. 13 is a left side view of the harvest mechanism and drive system of FIG. 11;

FIG. 14 is a right side view of the harvest mechanism and drive system of FIG. 11;

FIG. 23 is a top schematic view of a pair of freeze-thaw units located side by side;

FIG. 24 is a sectional longitudinal elevational view of the apparatus of FIG. 23;

DETAILED DESCRIPTION OF THE PREFERRED EMBODIMENTS

Figure 5:
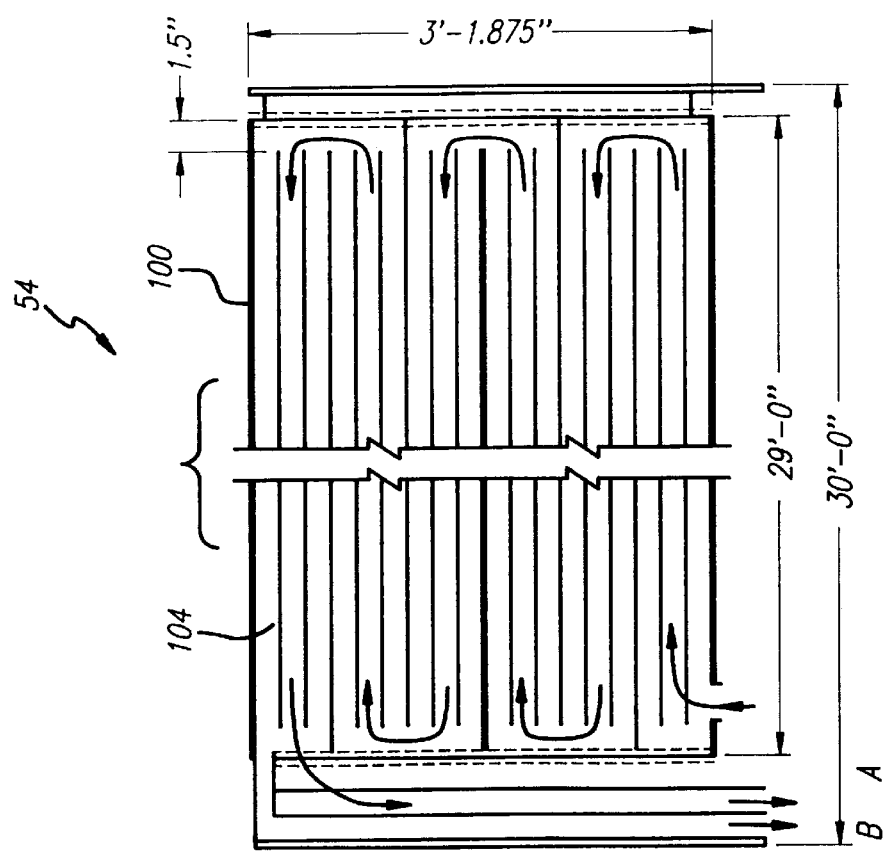
FIG. 5 is a cross-sectional view of one of the plates along line 5—5 of FIG. 4.

FIG. 1 is a simplified, cross-sectional side view of a preferred system 50 for closed-cycle, channeled processing of non-solid products according to the present invention. The system 50 comprises a freeze unit 52, thaw unit 54, and low temperature condenser unit 56. In the illustrated embodiment, the system 50 employs a freeze-thaw process with the freeze and thaw units 52, 54, and further dewaters with the low temperature condenser unit 56.

Referring to FIG. 2, one embodiment of present invention is a stand-alone freeze unit 52' including a plurality of channels for efficiently and automatically freezing juices, fruits and other non-solid food products into blocks. The freeze unit 52' includes a harvest mechanism 60 which may be frozen into or at the input end of frozen product 62. More specifically, the harvest mechanism 60 includes a dog 64 which may be frozen at the input of the product 62. The harvest mechanism 60 is adapted to move along the length of the freeze unit 52' to advance the product 62 out of the freeze unit 52 after the freezing process is completed. The dog 64 is shown extending from a harvest arm 66 only partially toward the bottom of a freeze channel 68. It is additionally contemplated that the dog 64 may be modified to extend completely to the bottom of the freeze channel 68.

The freeze unit 52' shown in FIG. 2 additionally includes a harvest gate 70 which is raised when the freezing process is completed so that the frozen product 62 can be advanced out of the freeze unit 52. A saw mechanism such as a chain saw 72 may be employed to cut the frozen product 62 into blocks as desired.

Referring to FIG. 3, a preferred stand-alone freeze unit 52" additionally includes a clean-in-place apparatus 80 formed, in part, integrally with the dog 64 and, in part, external to the harvest mechanism 60. Generally, the clean-in-place apparatus 80 functions to allow the inside of the freeze unit 52' to be cleaned after frozen products 62 have been advanced from the unit.

Referring to FIG. 10, the clean-in-place (CIP) apparatus 80 is shown in greater detail and comprises air, water, and CIP fluid sources 82, 84, 86, fluid dispensing hose 88, reel 90, header 92, branch line 94, and nozzles 96. Preferably, the branch line 94 is integrally assembled to or routed within the dog 64. The preferred nozzles 96 are adapted to direct a spray which will effectively clean the inside walls of the freeze unit 52 or channels therein. Furthermore, the preferred nozzles 96 are mounted flush to the exterior surface of the dog 64 to prevent potential damage to the nozzles 96 when frozen product 62 is being pushed out of the freeze unit 52. Alternatively, the spray nozzles may be mounted on the harvest bar or arm 64 or on the dogs above the upper freeze level and may be optionally lowered into the freeze channels and/or the thaw channels during the cleaning cycle.

Figure 4:
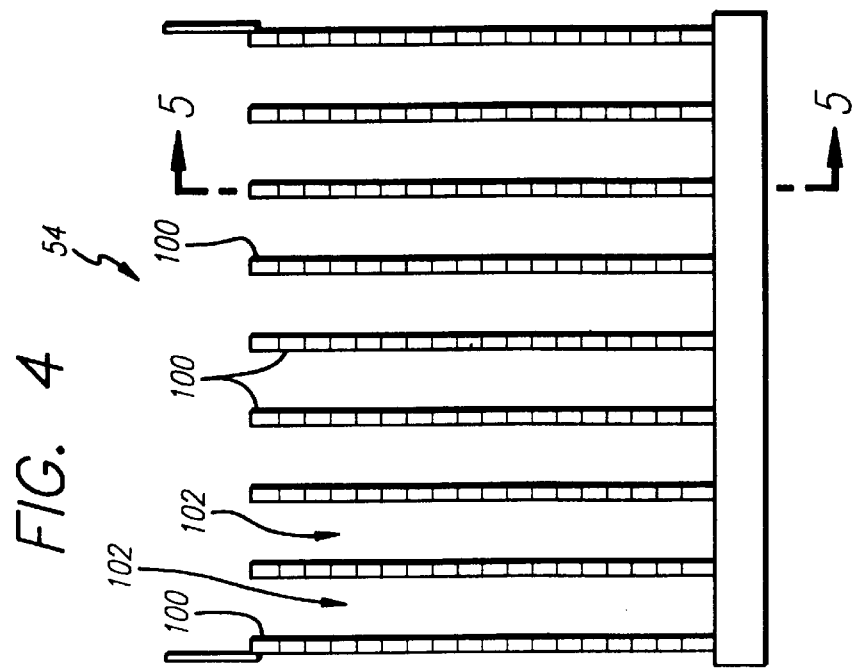
FIG. 4 is a cross-sectional side view of the channels within the thaw unit, taken along line 4—4 of FIG. 1.

Another aspect of the present invention is to provide a material processing system with a plurality of interconnected, channeled, modular sub-units which operate together as an integrated system or individually to process certain products. Thus, independent of the number or combination of units employed, a preferred embodiment, as shown in FIG. 4, includes units formed from a plurality of plates 100 which provide structural support and define processing channels 102. Although FIG. 4 shows a cross-section of a thaw unit 54, it should be understood that a preferred embodiment includes a freeze unit 52, thaw unit 54 and low temperature condenser unit 56, all of which include a plurality of aligned channels. The subject matter of the present invention additionally contemplates various configurations wherein the number of channels are not necessarily equal from one unit to another or aligned. Furthermore, the plates 100 are preferably, but not necessarily, vertically oriented as shown in FIG. 4.

An exemplary preferred distance between plates is approximately 3 inches, although this specification can be adjusted depending upon the products to be processed and other factors such as operating temperatures and cycle times. The employment of channels is a significant aspect of the present invention because it greatly increases the efficiency of the units. By way of example, a unit with approximately an 8,000 ton capacity can be assembled from a plurality of plates 100 forming one hundred channels 102, where each of the plates is oriented as shown in FIG. 4 and is approximately 2'×120' in size.

Referring to FIG. 5, a preferred plate 100 is shown in cross-section. The plate 100 defines a labyrinthine conduit 104 for a heat conducting medium such as liquid or vapor. The preferred conduit 104 is formed as shown in FIG. 5 and begins at "A" and ends at "B".

FIG. 6 is a cross-sectional view of a harvest guide rail 110 for the closed-cycle, channeled processing system 50. The harvest guide rail 110 includes a groove 112 and is secured to the units by any conventional securing mechanism.

FIGS. 7–9 show the harvest mechanism 60 in greater detail from top, side and front views, respectively. The harvest mechanism 60 includes opposing header members 114 which are sized to fit within the groove 112 (FIG. 6).

In FIG. 9, the shape of the dog 64' is somewhat different from that of the dog 64 shown in FIGS. 2 and 3. As may be readily appreciated, the dogs 64 and the harvest mechanism 60, in general, can be modified to suit particular product processing applications.

FIGS. 11–14 respectively illustrate top, front, left side and right side views of a drive system 120 for the harvest mechanism 60. The drive system 120 functions to move the harvest mechanism 60 along the length of a unit with the dog 64 extending into the unit as shown in FIG. 12. The drive system 120 comprises a drive motor and gear box 122, belt 124 attached to and driven by the motor 122, and a mechanism 126 such as a chain drive mechanically coupled to the headers 114 and the belt 124. A chain may be coupled to sprocket wheels 123 and 125, to drive the harvest bar 66 secured to the chain, and thereby move the "dogs" and channel blocks of frozen material. The drive system 120 is assembled from conventional components and can be modified as necessary to suit particular applications.

Figure 15:
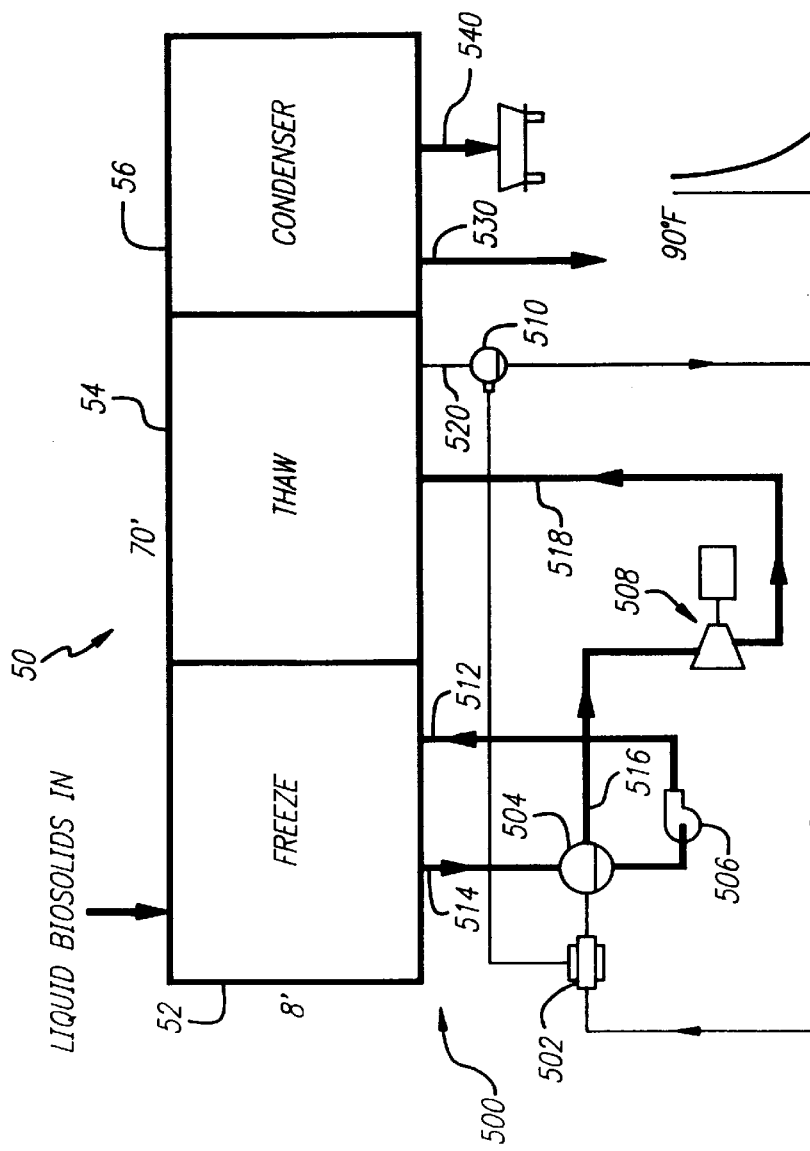
FIG. 15 is a functional block diagram of the closed-cycle, channeled processing system of FIG. 1 and a first preferred refrigerant flow control system of the overfeed type.

FIG. 15 is a functional block diagram of the closed-cycle, channeled processing system 50 and a first preferred refrigerant flow control system 500 of the overfeed type. An important aspect of the present invention is that thermal energy extracted from products being frozen in the freeze unit 52 is utilized by the thaw unit 54. Furthermore, the refrigerant flow control system 500 advantageously operates as a closed cycle system. An exemplary overfeed-type system 500 comprises a pilot feed valve 502, accumulator 504, ammonia pump 506, compressor 508, and liquid float 510 configured as shown.

An overfeed-type system is preferably employed for larger volume product processing systems.

Operationally, the pump 506 pumps refrigerant into the freeze unit 52 at line 512. Heated refrigerant exits the freeze unit 52 at line 514 and enters the accumulator 504. Low pressure vapor at line 516 is provided to the compressor 508 and exits as high pressure vapor at line 518 which, in turn, is provided to the thaw unit 54. The conveyance of thermal energy which occurs during the thawing process converts the high pressure vapor circulating through the thaw unit 54 to a high pressure liquid which exits the thaw unit 54 at line 520. The valve 502 is operative when the liquid reaches float 510. FIG. 15 also shows lines 530, 540 through which filtrate and solids exit the low temperature condenser unit 56, respectively.

The individual components of the overfeed-type refrigerant flow control system 500 are conventional and comprise commercially available parts. For example, a RWBII-222 rotary screw compressor manufactured by Frick, a division of York International Corporation of York, Pa., can be employed as a suitable compressor 508. Other types of compressors, such as reciprocating or ammonia absorption, can also be employed. By way of another example, an exemplary pilot valve 502 and a float 510 are available from H. A. Philips of Chicago, Ill.

Figure 16:
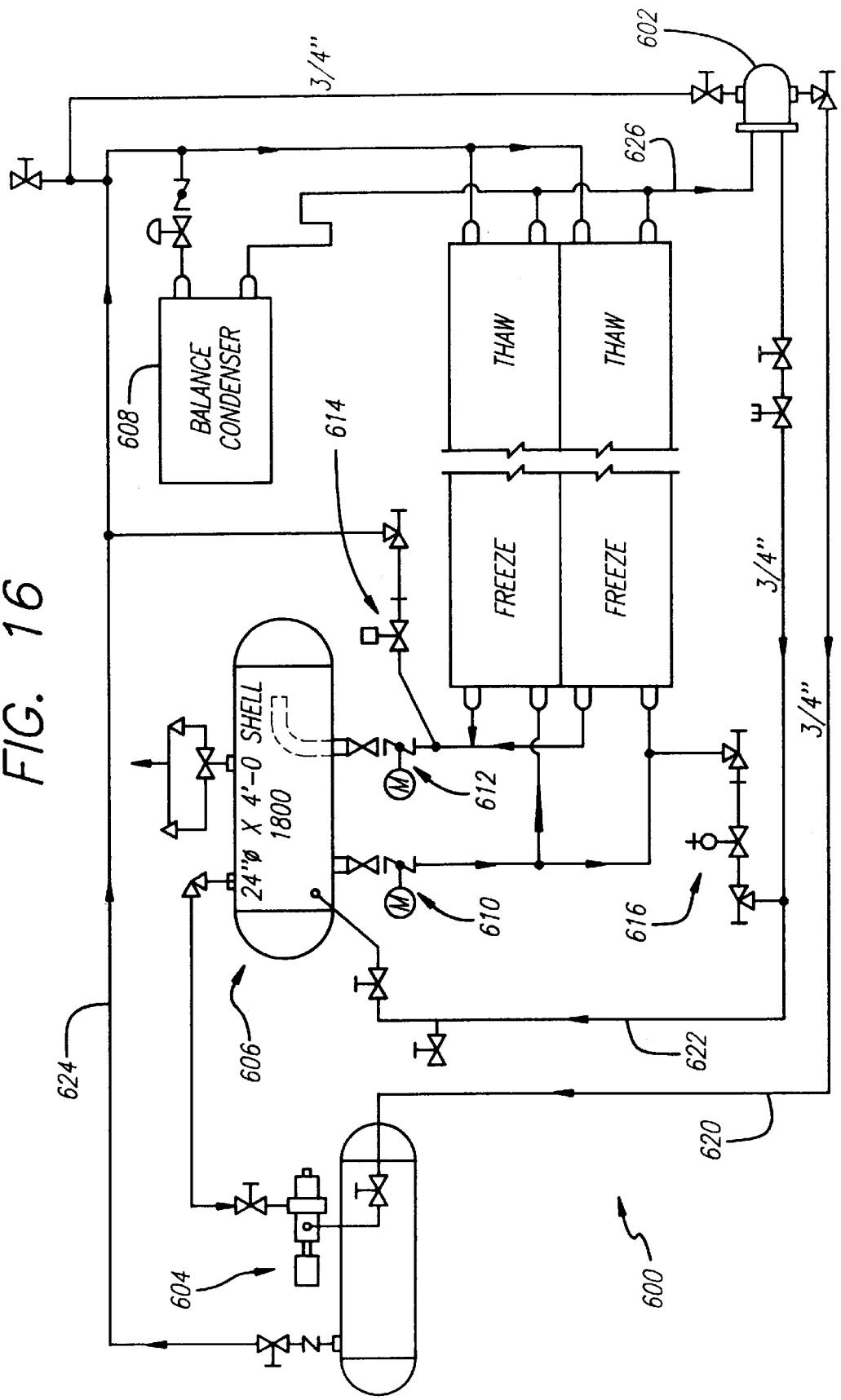
FIG. 16 illustrates a second preferred refrigerant flow control system of the flooded type for the closed-cycle, channeled processing system of FIG. 1.

FIG. 16 illustrates a second preferred refrigerant flow control system 600 of the flooded type functionally connected to a freeze-thaw unit with two channels. The flooded-type refrigerant flow control system 600 comprises a liquid float 602, compressor 604, accumulator 606, balancing condenser 608, isolation valves 610, 612, solenoid valve 614, and regulator valve 616 configured as shown. A flooded-type system is preferably employed for smaller volume product processing systems, e.g., less than 20–30 tons.

Operationally, liquid is provided at line 620 to cool the compressor 604. The float 602 at line 622 maintains the fluid level in the accumulator 606 which operates at approximately one-quarter full. The compressor 604 holds the accumulator 606 at approximately 15 psig, and high pressure vapor at approximately 100 psig is provided to the thaw units via line 624. High pressure liquid exits the thaw units at line 626. It should be noted that conventional systems typically require high pressure vapor of 160 psig or more. Thus, a significant advantage of the present system is its greater efficiency.

The balancing condenser 608 is loaded during the portion of the closed cycle beginning after the frozen products have been thawed and ending when the products in the freeze unit have been completely frozen (i.e., to accommodate a freeze-thaw cycle where the thawing process is completed before the freezing process is completed). Although the flooded-type refrigerant flow control system 600 illustrated in FIG. 16 is designed to accommodate such a freeze-thaw cycle, other systems particularly configured to accommodate cycles where the comparative efficiencies of the respective freeze and thaw cycles differ are also contemplated.

After the frozen products in the thaw units have been thawed, the isolation valve 612 is closed to isolate the freeze units from the accumulator 606. Hot gas escapes from the freeze units through the solenoid valve 614. The overfeed-type refrigerant flow control system 500 of FIG. 15 also includes a balance condenser, although one is not shown in the figure.

Another important aspect of the present invention is that the refrigerant control system provides a means for introducing thermal energy into the freeze units near the end of the cycle in order to warm the inside of the freeze channels so that the frozen products are loosened from the walls and can be readily advanced from the freeze unit to the thaw unit. In the refrigerant control system 600 of FIG. 16, the aforementioned means comprises the regulator valve 616 which is adjusted as needed depending upon the duration of the cycle, the nature of the products, etc.

It should additionally be noted that a thermal siphon flow is preferably implemented with regard to the circulation of refrigerant through the freeze unit.

The components of the flooded-type refrigerant flow control system 600 are conventional and comprise commercially available parts. For example, a RWBII-222 rotary screw compressor manufactured by Frick, a division of York International Corporation of York, Pa., can be employed as a suitable compressor 604. Other types of compressors, such as reciprocating or ammonia absorption, can also be employed. By way of another example, an exemplary float 602 is available from Hanson Technologies, Inc. of Chicago, Ill.

Figure 17:
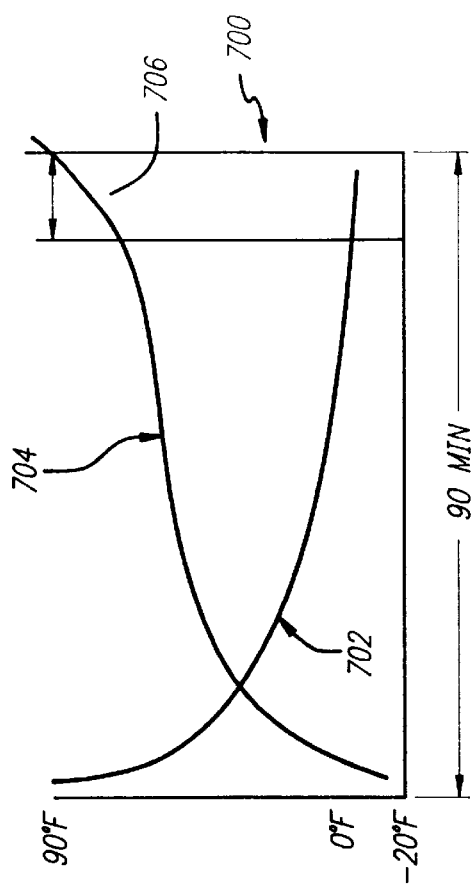
FIG. 17 is a plot of a cycle of the closed-cycle, channeled processing system of FIG. 1 showing the decreasing temperature of the refrigerant within the plates of the freeze unit, the increasing pressure within the channels of the thaw unit, and the region of the cycle where the balance condenser of FIG. 16 is employed to take the heat of rejection after the frozen products are thawed.

FIG. 17 is a graph 700 of a cycle of the closed-cycle, channeled processing system, showing a plot 702 of the decreasing temperature of the refrigerant within the plates of the freeze unit 52, a plot 704 of the increasing pressure within the channels of the thaw unit 54, and a region 706 of the cycle where the balance condenser 608 of FIG. 16 is employed to take the heat of rejection after the frozen products are thawed.

Figure 18:
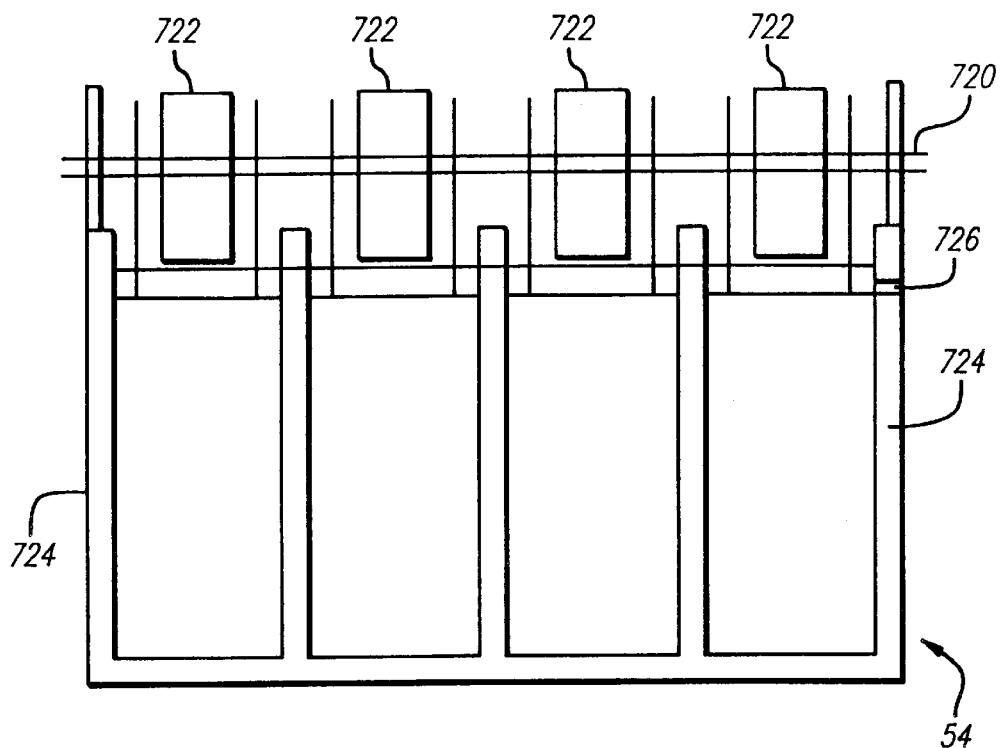
FIG. 18 is similar to the cross-sectional side view of the channels of FIG. 4 but additionally shows a cinch bar and a plurality of protrusions mechanically coupled to the two end plates of the thaw unit.

FIG. 18 shows a cross-sectional side view of the thaw unit 54 similar to FIG. 4, but additionally shows a cinch bar 720 and a plurality of protrusions 722 mechanically coupled to the two end plates 724 of the thaw unit 54. The thaw unit additionally is formed with a mechanism for introducing water into the thaw channels such as a water inlet valve 726. One aspect of this construction is that the thaw unit 54 is designed to prevent the frozen products from floating, due to their buoyancy in water, above the surface of the surrounding liquid where they would thaw less efficiently. Furthermore, optimum heat conduction will not be realized unless a heat conducting medium is present between the inside walls of the thaw channels and the frozen products therein. Accordingly, after the frozen products have been advanced into the thaw unit 54, the water inlet valve 726 is employed to introduce a sufficient quantity of water into the thaw channels to completely submerge the frozen products under the water. The protrusions 722 are sized and positioned along the cinch bar 720 such that the protrusions 722 descend into the thaw channels. The aforementioned sufficient quantity of water results in a top surface of the water which is above the bottom of the protrusions 722. Preferably, the plates within the thaw unit 54 are assembled such that the introduced water can flow from one thaw channel to another to ensure that the top surface of the water is of uniform height throughout the thaw unit 54.

The number of cinch bars 720 employed and their respective positions along the thaw unit 54 vary depending upon the size of the thaw unit 54 and the size and shape of the protrusions 722. The cinch bars 720 may also be employed to ensure proper alignment of the thaw unit channels. It should also be understood that FIG. 18 omits for the sake of clarity a top portion of the thaw unit 54.

Figure 19:
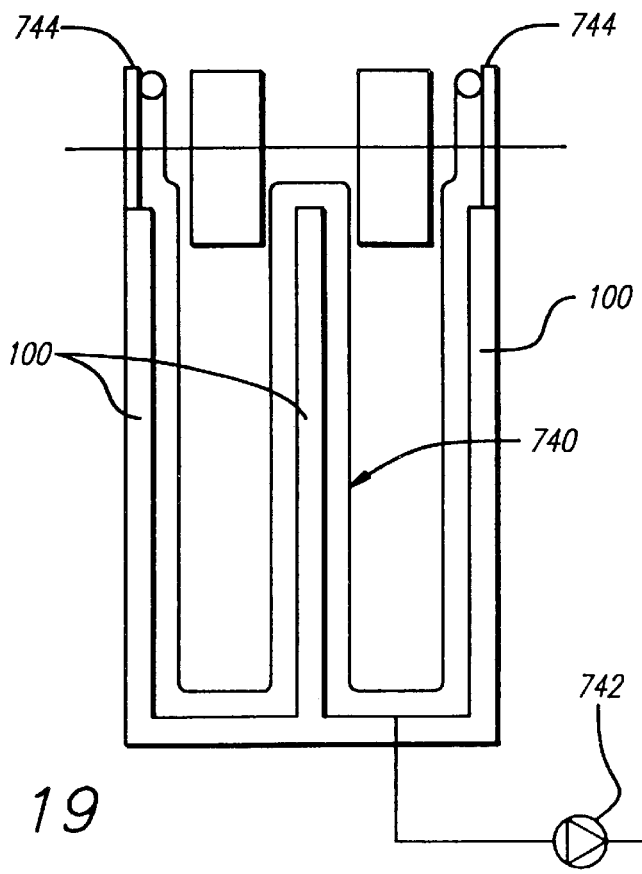
FIG. 19 illustrates an alternative embodiment of a channeled unit according to the present invention which additionally includes a liner material and a vacuum inducing mechanism for conductively coupling the liner to the plates.

FIG. 19 illustrates an alternative embodiment of a channeled unit according to the present invention which additionally includes a liner material 740 and a vacuum inducing mechanism 742. In processing particular products, e.g., certain foods, it is desirable for the inner surface of the channels to be made of a material such as stainless steel or titanium. However, the plates are more practically extruded from or formed of aluminum. Furthermore, the cyclical temperature changes and sometimes large surface areas characteristic of channels make it difficult to simply attach an inner liner to the channels while simultaneously maintaining optimum thermal conductivity between the plates and the liner 740. This problem may be resolved by employing the vacuum inducing mechanism 742 to pull a vacuum between the plates and the liner 740, thereby conductively coupling the liner 740 to the plates. The problem of differing coefficients of thermal expansion is resolved by employing seals 744 which, for example, may be made of neoprene. In FIG. 19, the liners 740 are shown spaced from the plates 100 for clarity, but they would actually be in intimate engagement.

Figure 20:
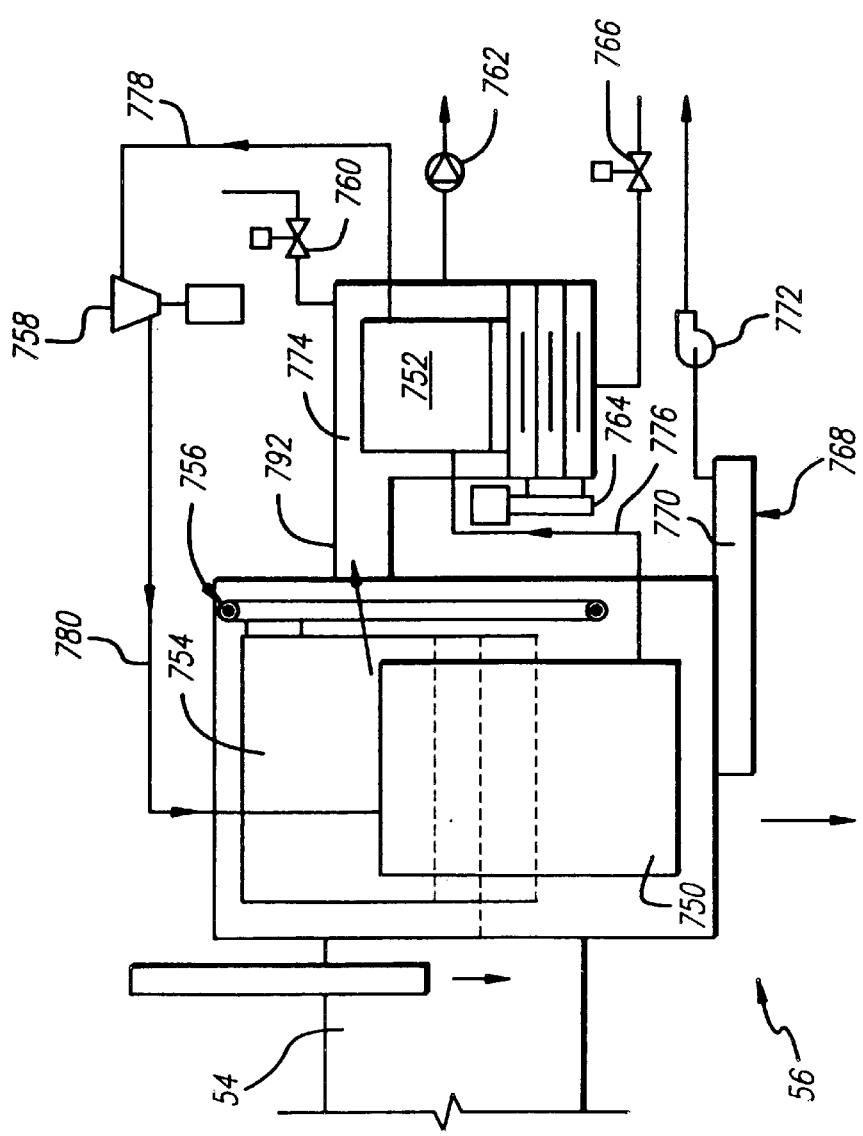
FIG. 20 is a functional block diagram of an alternative preferred low temperature condenser unit according to the present invention.

Referring to FIG. 20, another aspect of the present system is the low temperature condenser unit 56 which, it has been observed, further processes products to typically yield 50–90% dry product. As with the refrigerant flow control systems described above, the low temperature condenser unit 56 advantageously operates as a closed cycle system. The preferred low temperature condenser unit 56 illustrated in FIG. 20 comprises, most importantly, a heating channel-condenser 750 embodied in plates, a condenser-evaporator 752, and a harvest bar 754 shaped in a particular manner as discussed below in greater detail. The low temperature condenser unit 56 additionally comprises a chain drive system 756, compressor 758, vent 760, vacuum pump 762, level sensor 764, drain valve 766, harvest gate 768 with integrated filter 770, and pump 772.

Operationally, sludge is inserted into the heating channel-condenser 750 from the thaw unit 54 as shown. A vacuum is drawn in a vacuum chamber 774 with the vacuum pump 762. Significantly, the low temperature condenser unit 56 is not a vacuum cooling system; the aforementioned vacuum is only pulled to reduce the boiling temperature of water to approximately 35–40° F. High pressure refrigerant at line 776 is provided to cool the condenser-evaporator 752 which, in turn, provides low pressure vapor at line 778 to the compressor 758. High pressure vapor at line 780 is provided to the heating channel-condenser 750. Water vapor flows from the heating channel-condenser 750 to the condenser-evaporator 752 where it is condensed and collects at the bottom of the condenser-evaporator 752. The level sensor 764 is adjusted depending upon how dry the product needs to be. For example, the level sensor can be adjusted to actuate the drain valve 766 to drain the condenser-evaporator 752 after the detected water level corresponds to 80% dry product. Alternatively, a timer (not shown in FIG. 20) can be employed to end a cycle. The harvest gate 768, in the illustrated embodiment, includes an integrally formed filter 770 which, for example, is of the membrane type. As may be readily appreciated, the selection of a filter 770 depends largely upon the nature of the products being processed. The pump 772 is employed to remove the filtrate.

Figure 21:
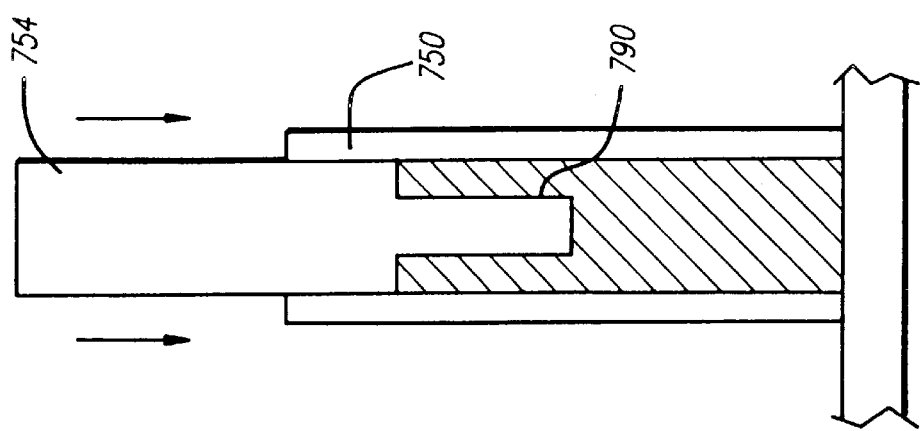
FIG. 21 illustrates the heating channel and preferred harvest bar configuration of the low temperature condenser unit of FIG. 20.

Most of the components of the low temperature condenser unit 56 are conventional and comprise commercially available parts. For example, the compressor 758 is a commercially available 80 horsepower compressor and the vacuum 762 is a commercially available 5 horsepower vacuum. One notable exception is the harvest bar 754 which, as best illustrated in FIG. 21, is particularly shaped and positioned relative to the inner walls of the heating channel-condenser 750. More specifically, the harvest bar 754 includes a centrally positioned extended portion 790 as shown in FIG. 21 which significantly improves the thermal conductivity between the sludge and the surrounding heating channel-condenser 750 by forcing the sludge toward the heating channel-condenser 750. The extended portion 790 is particularly useful in optimizing thermal conductivity toward the upper portion of the heating channel-condenser 750.

The chain drive system 756 operates to drive the harvest bar 754 up and down within the heating channel-condenser 750 in a predetermined manner. It is essential that the harvest bar 754 fit precisely, but with freedom to move up and down, within the heating channel-condenser 750 as shown in FIG. 21.

Referring to FIG. 20, the aforementioned predetermined manner of driving the harvest bar 754 facilitates escape of the water vapor into the vacuum chamber 774 through an optional conduit 792. Alternatively, a vapor escape valve (e.g., timer controlled) or the like can be provided or the harvest bar 754 can be formed with such a valve.

Thus, a key advantage of the low temperature condenser unit 56 is its highly efficient, closed cycle operation which utilizes the energy exchange between the heating channel-condenser 750 and the condenser-evaporator 752 while simultaneously employing the aforedescribed harvest bar/heating channel-condenser relationship to enhance thermal conductivity between the products being processed and the heating channel-condenser 750.

Reference is again made to U.S. Pat. No. 5,029,453, granted Jul. 9, 1991, entitled Channel Block Ice System, J. Sterling Scherer, inventor; and this prior patent, in which one of the present inventors was the inventor, is hereby incorporated by reference into the present specification.

It is further noted that the embodiments of the present invention may vary significantly in size. For example, the freezing units may be comparable in size to those disclosed in the prior patent, in the order of six feet wide, 30 inches deep and 36 feet long. However, it is contemplated that much larger units could be built in place. These larger units may have freezing and thawing sections each 50 feet long, 14 feet wide and 10 feet deep (high) with 14 to 30 channels. Using four of these installations, an 8,000 ton or 6,000 horsepower system would be produced providing biosolids treatment facilities for municipalities of 1,000,000 persons or more.

Figure 22:
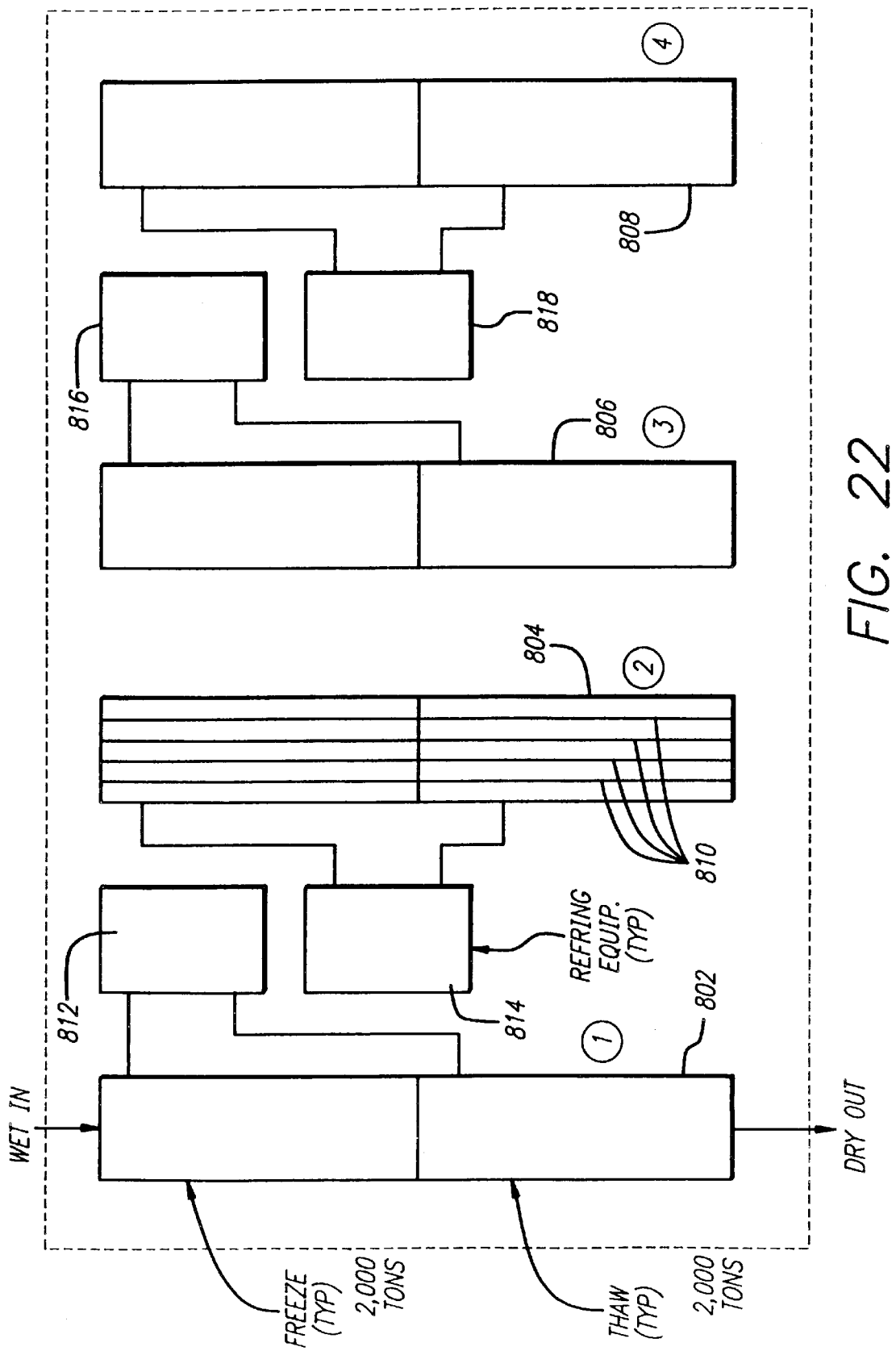
FIG. 22 is a schematic showing of a large scale freeze-thaw system suitable for the processing of biosolids for a large municipality.

FIG. 22 is a schematic showing of a very large "build-in-place" installation. It includes four freeze-thaw systems 802, 804, 806 and 808. These systems may, for example, be approximately 100 feet long, 10 feet high and 14 feet wide. Each unit may, for example, be longitudinally divided into channels by plates such as the plates 810 shown in system 804, and these plates preferably include channels for refrigerant as discussed hereinabove.

Preferably, between 10 and 20, for example, 14 plates 810 may be employed in each system.

The refrigerating equipment 812, 814, 816 and 818 may be located substantially as indicated to provide driveway access to each of the systems. The collateral equipment, such as output filtering, concentrating and dewatering equipment, and other operational equipment described in this specification may be employed on a scaled-up basis for the four systems of FIG. 22. A system of this size is estimated to have a capacity of about 8,000 tons, and a power requirement of about 6,000 horsepower.

Referring now to the system of FIGS. 23–27, FIG. 23 is a top plan view of a system 902 which includes a first freeze-thaw unit 904 and a second freeze thaw unit 906. For clarity of illustration, the top insulating cover plate 908 shown in the side view of FIG. 24 has been removed in the showing of FIG. 23. The units 904 and 906 are also preferably thermally spaced from one another or provided with a thermally insulated spacer 910 between the two units, as one unit will normally be in a freeze portion of the freeze-thaw cycle while the other is in a thaw portion of the cycle. In addition, insulating panels 911 may be mounted around the sides and across the bottom of the system 902.

Each of the freeze-thaw units 904 and 906 is generally similar to the units shown in the earlier drawings of this specification or in U.S. Pat. No. 5,029,453 cited hereinabove. The freeze-thaw unit 904 includes the movable harvest bar assembly 912 and discharge gate 914, which operate independently from the harvest bar assembly 916 and discharge gate 918 associated with unit 906, in view of the differently timed, but complementary cycles of operation of the two units.

The drive motor 920 for one of the harvest bars is shown in FIG. 24, with a separate drive motor being provided for the other harvest bar assembly. The separate drive motors 922 and 924 for independently raising the discharge gates 914 and 918, respectively, are shown at the right hand end of FIG. 23. The refrigerant supply and return conduits are shown at reference number 926 in FIG. 24.

Figure 25:
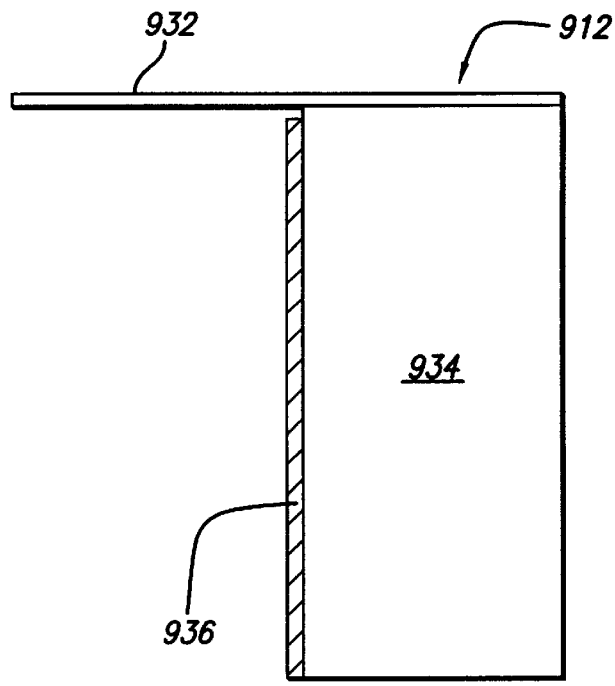
FIG. 25 is a schematic showing of a depending arm carried by the harvest bar and extending down into one of the channels of the freeze-thaw apparatus.
Figure 26:
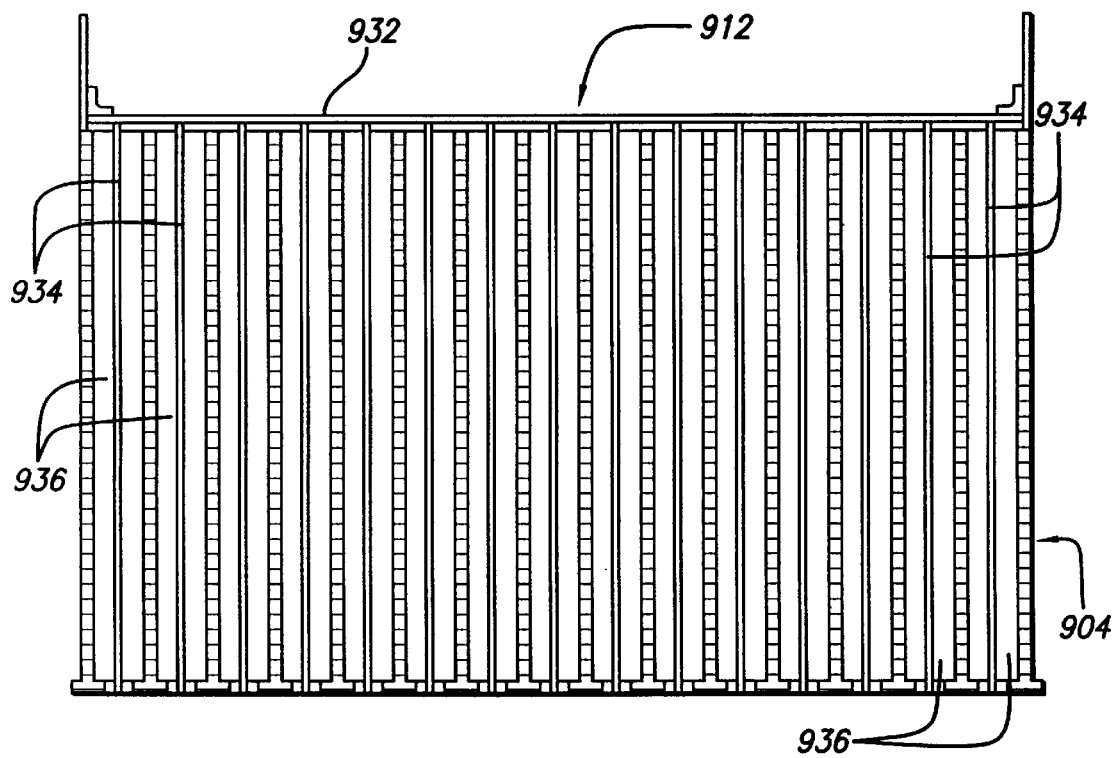
FIG. 26 is a schematic cross-sectional view showing the location of the harvest bar and the depending arms carrying squeegee-like resilient material for advancing treated materials from the freeze-thaw units.

The construction of one of the harvest bar assemblies 912 is shown schematically in FIGS. 25 and 26. The discharge bar assembly 912 includes an upper flat metal plate 932 and a series of depending metal plates 934, one for each channel of the freeze-thaw unit 904. As disclosed hereinabove, the side edges of plate 932 ride in tracks, and the harvest assemblies are moved by cables or chains controlled by drive motor 920 and a second drive motor. Secured to each of the depending plates 934 is one or more layers of flat resilient sheet material 936 which provide squeegee-like function to advance the treated freeze-thaw material out of the channels of the unit 904 when the freeze-thaw cycle has been completed.

The harvest bar assemblies may be provided with cleaning nozzles as shown in FIGS. 3 and 10B, for example.

Figure 27:
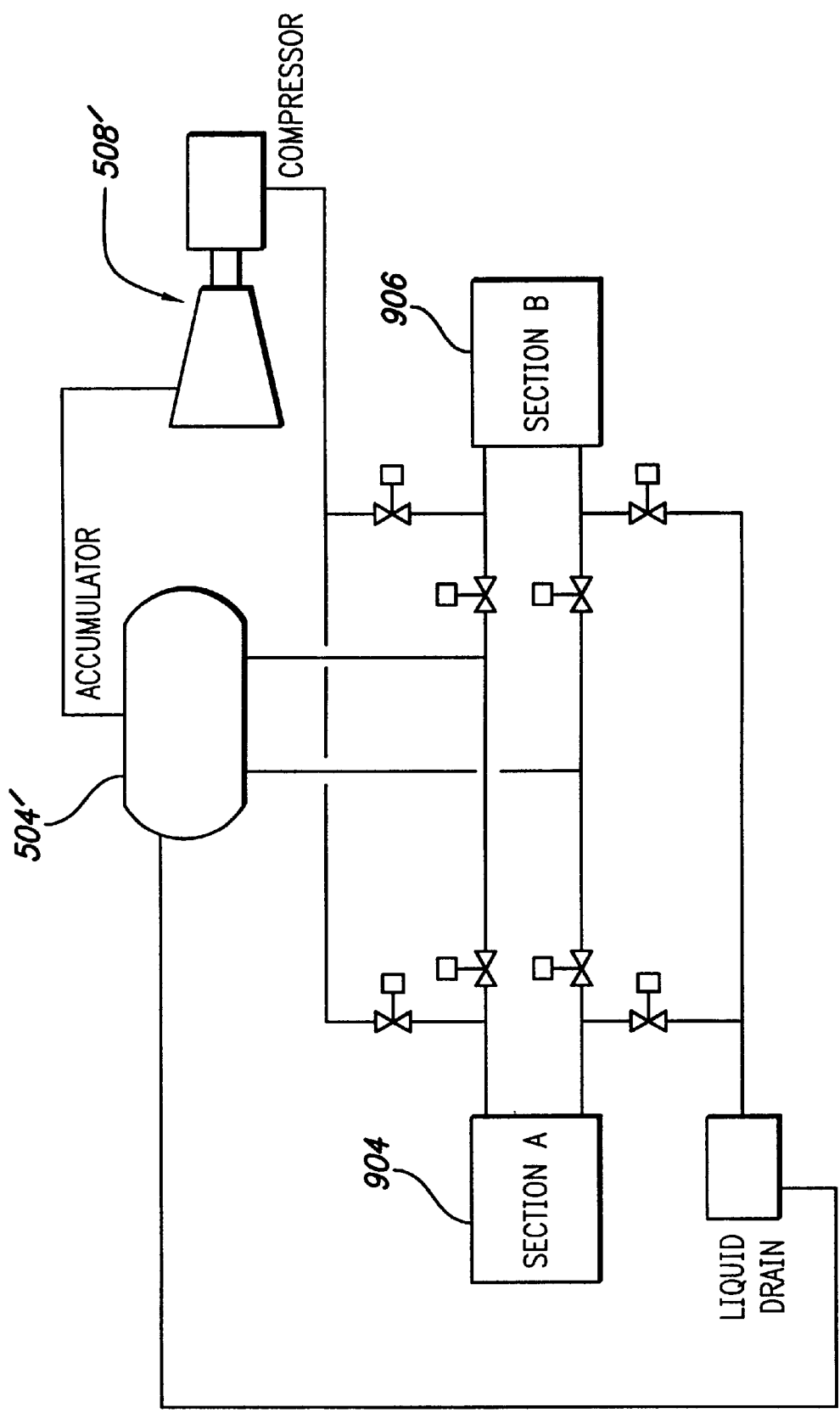
FIG. 27 is a diagram of a typical refrigeration circuit which may be used with the apparatus of FIGS. 23 and 24.

FIG. 27 shows a refrigeration system for the system of FIGS. 23 and 24, with the freeze-thaw cycles of units 904 and 906 being complementary to one another, with the thermal energy extracted from one unit as the material is being frozen, being used to thaw the previous frozen material in the other unit. The refrigeration system as shown in FIG. 27 is very nearly the same as that shown in FIG. 15 and described hereinabove with appropriate adjustments for a flooded configuration. Accordingly, certain major components of the refrigeration circuit of FIG. 27 corresponding to those of FIG. 15, with thermosyphon refrigerant flow in place of pump, will be labeled with primed reference numerals corresponding to the components of FIG. 15. The operation of the system of FIG. 27 is substantially the same as discussed hereinabove with FIG. 15 and therefore will not be repeated. It is also noted that other types of known refrigeration systems may be employed, with the heat extracted in the course of freezing the material in one unit being used to thaw the material in the other unit.

Accordingly, the mode of operation of the system is as follows. Initially, let us assume that the status of the cycle is as shown in FIG. 23 with the thawed material being advanced out of unit 906 by the movement of the harvest bar assembly 916, with the gate 918 raised. At this stage, the material in unit 904 is frozen. After the treated material in unit 906 is expelled from the unit 906, the gate 918 is closed down, and a new batch of material to be treated is supplied to unit 906. Then, the new material in unit 906 is cooled and frozen and the associated heat removed from this material is employed to thaw the material in unit 904. When the material in unit 904 is fully thawed, and the material in unit 906 is frozen, then gate 914 is raised, and harvest bar 912 is advanced to force the treated material in unit 904 out of the unit. Incidentally, following the freeze-thaw process, there will be some free water generated, and this will be drained off. Concerning another aspect of the construction, the units are preferably thermally insulated on all sides to increase efficiency, and to minimize the additional power supplied during each cycle.

Incidentally, with regard to the products and materials which can be handled by the present apparatus, broadly, any product or material which can be frozen may be processed by the present systems. Specifically, products or materials which may be processed include juices, fruits, eggs, meat, poultry, seafood, dog food, cat food, by-products, biosolids, residuals and sludges from industrial processes such as pulp and paper, ceramic, breweries, or refining operations. Again, the present systems are applicable to any products which can be frozen, for example, for storage or processing.

It is noted in passing that certain specific dimensions, pressures or other specific information is given relative to various preferred embodiments of the invention. For specific examples, some specific dimensions, vacuum pressure, or line diameters are given in FIGS. 1, 5 and 16 of the drawings, and at various points in the specification. It is to be understood that these dimensions, vacuum pressures, line diameters, and specific system configurations are merely illustrative or representative of preferred embodiments or of actual operating systems, and that different dimensions, pressures and refrigeration systems may be employed to implement the present invention, without departing from the spirit and scope of the invention.

Concerning the harvest assemblies for advancing treated products out of the channels, they may take various configurations in addition to those described hereinabove. Thus, by way of example and not of limitation, each channel may have a recess or track in the bottom with a lead screw in the recess or track, in threaded engagement with a movable member similar in function to the depending member 934, 936 shown in FIGS. 25 and 26. Then, when it is desired to advance material out of the channels, the lead screws are rotated to advance the movable squeegee-like or plunger-type members, which make a close fit with the channels, toward the outlet end of the units, thereby advancing the residual treated material out of the units.

In conclusion, it is to be understood that the foregoing detailed description and the accompanying drawings illustrate the principles of the invention. However, various changes and modifications may be employed without departing from the spirit and scope of the invention. Thus, by way of example and not of limitation, it is contemplated that the cleaning nozzles may either be incorporated into the dogs, or may be separately mounted on the harvest bar or arm and activated or lowered into the freezing and/or thawing channels, between freezing cycles or periodically, to clean the apparatus. For freeze-thaw units such as that of FIG. 1, the harvest arm or bar may be activated to travel the fall length of both the freeze section and the thawing section to provide the clean-in-place spray cleaning action. In addition, although the systems described herein are rectilinear, it is contemplated that the systems could have other geometries, and could be circular, with centrally pivoted harvest bar assemblies, for example, and circular channels, interrupted to provide an outlet point at any desired angle around the circular channels. Alternative refrigeration systems and components thereof may be employed instead of those described. Accordingly, the present invention is not limited to the specific forms shown in the drawings and described in detail hereinabove.

What is claimed is:

1. An efficient channel frozen material processing system for freezing and thawing materials comprising:
    a first freeze-thaw unit comprising a first elongated channel; and
    a second freeze-thaw unit comprising a second elongated channel;
    first and second independently movable barriers for selectively blocking the flow of material out from each of said units;
    first and second harvest assemblies movable for advancing said materials out from each of said units; and
    a refrigeration system for freezing material supplied to each of said freeze-thaw units, said refrigeration system coupled to exchange heat absorbed from one of said freeze-thaw units in the course of freezing said material, with the other of said units to thaw frozen blocks of material which have been frozen in said other unit.

2. A system as defined in claim 1 wherein said first and second units are mounted side by side, thermally spaced or insulated from one another.

3. A system as defined in claim 1 wherein said harvest assemblies include depending squeegee-like members for engaging the inner walls of said channels to advance said materials out of said channels.

4. A system as defined in claim 1 wherein each of said units includes a plurality of parallel channels, and wherein each said harvest assembly includes a plurality of squeegee-like members extending into said channels.

5. A system as defined in claim 1 wherein said first and second freeze-thaw units have separate material processing channels and independently movable barriers.

6. A system for processing material that can be brought to a solid state by lowering the temperature of the products, the system comprising:
    first and second units, each including a plurality of channels adapted to receive material that can be brought to a solid state by lowering the temperature of the products, said units being adapted to transform the material into frozen material;
    said system also including arrangements to transform the frozen products into released liquid and residual material;
    said first and second units being in heat-exchanging relationship so that as material is frozen in one of said units, material is being thawed in the other unit; and
    each said unit including an independently movable harvest assembly including protrusions extending into the channels for moving said residual material out of said units.

7. A system as defined in claim 6 wherein said first and second units are mounted side by side, thermally spaced or insulated from one another.

8. A system as defined in claim 6 wherein said harvest assemblies include squeegee-like members for engaging the inner walls of said channels to advance said materials out of said channels.

9. A system as defined in claim 6 wherein each of said units includes an independently operated outlet door or barrier.

10. A system for processing products that can be brought to a solid state by lowering the temperature of the products, the system comprising:
    a refrigeration unit including a plurality of plates defining a plurality of channels adapted to receive products that can be brought to a solid state by lowering the temperature of the products, each of the plates defining a conduit for circulating a refrigerant therethrough, thereby transforming the products into frozen products;
    a harvest assembly adapted to be repositioned along said channels; and
    a plurality of squeegee-like members mechanically coupled to said harvest assembly to advance the thawed material out of the channels when said harvest arm is repositioned.

11. The system for processing material of claim 10 wherein clean-in-place apparatus is mounted on said harvest assembly and is adapted to operate while said harvest arm is being repositioned.

12. The system for processing products of claim 11 wherein said clean-in-place apparatus includes nozzles adapted to direct at least one fluid over inside surfaces of said channels.

13. A system as defined in claim 10 wherein said members are located within said freezing channels at one end thereof, and wherein said harvest assembly is repositioned for a distance at least substantially equal to the length of said channels.

14. A system for the freeze-thaw processing of materials, comprising:

first and second chambers for holding materials to be freeze-thaw processed, said chambers being thermally spaced or insulated from one another;

input and output arrangements for supplying said materials to be freeze-thaw processed to said chambers;

a refrigeration system for fully freezing materials solidly in a static condition in one of said chambers and for concurrently thawing previously frozen material in the other of said chambers, using heat from the chamber where the material is being frozen to thaw the material in the other chamber; and said chambers being open at the top thereof to permit expansion of the material when it is fully frozen.

15. A system as defined in claim 14 further including a movable harvest assembly including extensions extending into each of said chambers for discharging material from said chambers following thawing of said material.

16. A system for the freeze-thaw processing of materials, comprising:

first and second chambers for holding materials to be freeze-thaw processed;

input and output arrangements for supplying said materials to be freeze-thaw processed to said chambers;

a refrigeration system for fully freezing materials in a static condition in one of said chambers and for concurrently thawing previously frozen material in the other of said chambers, using heat from the chamber where the material is being frozen, to thaw the material in the other chamber;

said chambers being open at the top to permit the expansion of ice as it freezes; and a separate movable harvest assembly extending down into each of said first and second chambers for discharging materials from said chambers.

17. A system as defined in claim 16 wherein each of said chambers includes a plurality of channels open at the top, and wherein each of said harvest assemblies include squeegee-like members which extend downward into each said channel.

18. A system for the freeze-thaw processing of materials, comprising:

first and second chambers for holding materials to be freeze-thaw processed;

input and output arrangements for supplying said materials to be freeze-thaw processed to said chambers;

a refrigeration system for fully freezing materials in a static condition in one of said chambers and for concurrently thawing previously frozen material in the other of said chambers, using heat from the chamber where the material is being frozen, to thaw the material in the other chamber;

said chambers being open at the top to permit the expansion of material as it freezes;

separate movable harvest assemblies extending into each of said chambers for discharging materials from said chambers; and drain arrangements for discharging free water from said chambers following thawing.

19. A system as defined in claim 18 wherein said first and second chambers are mounted side by side, thermally spaced or insulated from one another.

20. A system as defined in claim 18 wherein insulating material is provided around said chambers.

21. A system for the freeze-thaw processing of materials, comprising:

first and second chambers for holding materials to be freeze-thaw processed;

input and output arrangements for supplying said materials to be freeze-thaw processed to said chambers;

a refrigeration system for fully freezing materials in a static condition in one of said chambers and for concurrently thawing previously frozen material in the other of said chambers, using heat from the chamber where the material is being frozen to thaw the material in the other chamber;

said chambers being open at the top to permit the expansion of material as it freezes;

separate movable harvest assemblies extending into each of said chambers for discharging materials from said chambers;

drain arrangements for discharging free water from said chambers following thawing; and said harvest assemblies including depending squeegee-like members for engaging the inner walls of said channels to advance said materials out of said channels.

* * * * *